United States Patent
Xu et al.

(10) Patent No.: US 10,877,761 B1
(45) Date of Patent: Dec. 29, 2020

(54) WRITE REORDERING IN A MULTIPROCESSOR SYSTEM

(71) Applicant: Mellanox Technologies, Ltd., Yokneam (IL)

(72) Inventors: Rui Xu, Marlborough, MA (US); Carl Ramey, Westborough, MA (US); Benjamin Cahill, Lancaster, MA (US); Diane Orf, Natick, MA (US); Mark B. Rosenbluth, Uxbridge, MA (US); Michael Cotsford, Bellingham, MA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/706,749

(22) Filed: Dec. 8, 2019

(51) Int. Cl.
| | |
|---|---|
| G06F 9/32 | (2018.01) |
| G06F 9/46 | (2006.01) |
| G06F 13/372 | (2006.01) |
| G06F 13/40 | (2006.01) |
| G06F 9/54 | (2006.01) |

(52) U.S. Cl.
CPC .............. *G06F 9/321* (2013.01); *G06F 9/466* (2013.01); *G06F 9/546* (2013.01); *G06F 13/372* (2013.01); *G06F 13/4004* (2013.01)

(58) Field of Classification Search
None
See application file for complete search history.

(56) References Cited

U.S. PATENT DOCUMENTS

| | | | |
|---|---|---|---|
| 8,738,860 B1 * | 5/2014 | Griffin | G06F 12/0831 711/122 |
| 10,069,701 B2 * | 9/2018 | Elias | H04L 49/108 |
| 10,394,653 B1 | 8/2019 | Rosenbluth | |
| 2003/0115380 A1 * | 6/2003 | Ajanovic | G06F 13/4269 710/1 |

(Continued)

OTHER PUBLICATIONS

Radhika et al., "Consistency Models in Distributed Shared Memory Systems", International Journal of Computer Science and Mobile Computing (IJCSMC), vol. 3, Issue 9, pp. 196-201, Sep. 2014.

*Primary Examiner* — Henry Tsai
*Assistant Examiner* — Aurangzeb Hassan
(74) *Attorney, Agent, or Firm* — Kligler & Associates Patent Attorneys Ltd (57) ABSTRACT

A multiprocessor device includes cores and at least one ingress-write ordering circuitry (IWOC) including first and second counters associated with first and second destinations. The IWOC is configured to assign sequential numbers to write transactions received from a source, according to an order of reception at the IWOC, and to forward the write transactions from the IWOC to the first and second write-transaction destinations, while preserving the order, by incrementing the first and second counters such that both the first counter and the second counter track a sequential number of a next write transaction that the IWOC will forward, forwarding a first write transaction to the first destination only provided that the sequential number of the first write transaction matches the first counter, and forwarding a second write transaction to the second destination only provided that the sequential number of the second write transaction matches the second counter.

20 Claims, 3 Drawing Sheets

(56) References Cited

U.S. PATENT DOCUMENTS

| | | | |
|---|---|---|---|
| 2006/0036821 A1* | 2/2006 | Frey | H04L 41/00 |
| | | | 711/162 |
| 2008/0008202 A1* | 1/2008 | Terrell | H04L 45/00 |
| | | | 370/401 |
| 2012/0131309 A1* | 5/2012 | Johnson | G06F 15/80 |
| | | | 712/41 |
| 2013/0318051 A1* | 11/2013 | Kumar | G06F 16/1748 |
| | | | 707/692 |
| 2013/0343390 A1* | 12/2013 | Moriarty | H04L 43/50 |
| | | | 370/392 |
| 2017/0068640 A1* | 3/2017 | Shahar | H04L 49/9068 |
| 2019/0102301 A1* | 4/2019 | Li | H04L 45/74 |

* cited by examiner

WRITE REORDERING IN A MULTIPROCESSOR SYSTEM

FIELD OF THE INVENTION

The present invention relates generally to multi-processor systems, and particularly to the ordering of memory accesses in multi-processor systems.

BACKGROUND OF THE INVENTION

In multi-processor systems, while the order of the memory accesses in some system busses adheres to Total-Store-Order (TSO) discipline, the order of the memory accesses of some common microprocessor cores is weaker ("relaxed"), allowing out-of-order execution of memory accesses. Strictly ordered execution is typically safer, but Relaxed-order execution may be faster, as processors can sometimes continue execution without waiting for memory cycles to complete. In "Consistency Models in Distributed Shared Memory Systems," International Journal of Computer Science and Mobile Computing (IJCSMC), Vol. 3, Issue 9, September 2014, pages 196-201, Radhika et al. describe various consistency models of a distributed memory in a multiprocessor environment.

SUMMARY OF THE INVENTION

An embodiment of the present invention that is described herein provides a multiprocessor device including a plurality of cores and at least one ingress-write ordering circuitry (IWOC). The IWOC includes a first counter associated with a first write-transaction destination, and a second counter associated with a second write-transaction destination. The IWOC is configured to assign sequential numbers to write transactions that the IWOC receives from a write-transactions source, according to an order of reception of the write transactions at the IWOC, and to forward the write transactions from the IWOC to the first and second write-transaction destinations, while preserving the order, by (i) incrementing the first and second counters such that both the first counter and the second counter track a sequential number of a next write transaction that the IWOC will forward, (ii) forwarding a first write transaction to the first write-transaction destination only provided that the sequential number of the first write transaction matches the first counter, and (iii) forwarding a second write transaction to the second write-transaction destination only provided that the sequential number of the second write transaction matches the second counter.

In an embodiment, the multiprocessor device further includes a system bus, the write-transactions source includes the system bus, and the first write-transaction destination includes the cores. In a disclosed embodiment, the write transactions forwarded to the first and second write-transaction destinations arrive at the first and second write-transaction destinations after first and second delays, respectively, and the IWOC is configured to increment the first counter based on the first delay, so as to reflect arrival times of the write transactions at the first write-transaction destination, and to increment the second counter based on the second delay, so as to reflect arrival times of the write transactions at the second write-transaction destination.

In an example embodiment, the IWOC is configured to increment both the first counter and the second counter in response to forwarding a write transaction to either the first write-transaction destination or the second write-transaction destination. In another embodiment, the IWOC includes first and second queues and is configured to (i) queue in the first queue the write transactions pending for forwarding to the first write-transaction destination, compare the sequential number of the write transaction at a head of the first queue to the first counter, and forward the write transaction at the head of the first queue only when the sequential number matches the first counter, and (ii) queue in the second queue the write transactions pending for forwarding to the second write-transaction destination, compare the sequential number of the write transaction at the head of the second queue to the second counter, and forward the write transaction at the head of the second queue only when the sequential number matches the second counter.

There is additionally provided, in accordance with an embodiment of the present invention, a multiprocessor device including a plurality of cores and at least one egress-write ordering circuitry (EWOC). The EWOC is configured to assign sequential numbers to write transactions that the EWOC receives from at least two write-transaction sources, according to an order of reception of the write transactions at the EWOC, and to select and output the write transactions from the EWOC, while preserving the order, responsive to the sequential numbers assigned to the write transactions.

In an embodiment, the multiprocessor device further includes a system bus, one of the write-transaction sources includes the cores, and the EWOC is configured to output the write transactions to the system bus.

There is also provided, in accordance with an embodiment of the present invention, a method in a multiprocessor device having a plurality of cores. The method includes, in at least one ingress-write ordering circuitry (IWOC), maintaining a first counter associated with a first write-transaction destination, and a second counter associated with a second write-transaction destination. Sequential numbers are assigned to write transactions that the IWOC receives from a write-transactions source, according to an order of reception of the write transactions at the IWOC. The write transactions are forwarded from the IWOC to the first and second write-transaction destinations, while preserving the order, by (i) incrementing the first and second counters such that both the first counter and the second counter track a sequential number of a next write transaction that the IWOC will forward, (ii) forwarding a first write transaction to the first write-transaction destination only provided that the sequential number of the first write transaction matches the first counter, and (iii) forwarding a second write transaction to the second write-transaction destination only provided that the sequential number of the second write transaction matches the second counter.

There is further provided, in accordance with an embodiment of the present invention, a method in a multiprocessor device having a plurality of cores. The method includes, in at least one egress-write ordering circuitry (EWOC), assigning sequential numbers to write transactions that the EWOC receives from at least two write-transaction sources, according to an order of reception of the write transactions at the EWOC. The write transactions are selected and output from the EWOC, while preserving the order, responsive to the sequential numbers assigned to the write transactions.

The present invention will be more fully understood from the following detailed description of the embodiments thereof, taken together with the drawings in which:

DETAILED DESCRIPTION OF EMBODIMENTS

Overview

To increase computer system performance, it may be advantageous to execute received memory accesses as soon as the accesses are received, with no delay. This approach, however, may cause erroneous execution of computer programs, especially in multiprocessor systems, where memory accesses arrive from multiple sources with varying delays, and sometimes out of order. For example, if a first Write transaction writes a data word, and a second Write transaction sets a corresponding Data Ready flag, an observer must "see" the Data Ready flag only after the data word is written.

Various memory access models exist, which define the order of memory accesses, and may allow some degree of out-of-order execution. For example, Total Store Order (TSO), which is used in Peripheral Component Interconnect Interface Express (PCIe), mandates orderly execution of Write transactions, but allows out-of-order execution of read-read, read-write and write-read transactions.

U.S. Pat. No. 10,394,653, whose disclosure is incorporated herein by reference, discloses a multiprocessor system wherein each processor is configured to communicate data transactions with other cores, through a system interconnect bus or through other channels, including implementation of ARM Coherent Hub Interface (CHI) to achieve Total Store Order (TSO).

Keeping the order is further complicated when a core of the multiprocessor system receives data from different sources. In embodiments of the present invention, for example, a core may receive some data from a peripheral (or from another processor) via a system bus (e.g., PCIe), and receive other data directly, through a dedicated channel (which is referred to hereinbelow as "Ring channel"). Delays through the different paths may vary, and, hence, Write transactions may be received at the core out of order.

Cores that are typically used in multiprocessor systems (e.g. ARMv8) may support a relaxed order model. This means that processor stores to different addresses may become visible in any order unless there is a memory barrier between the accesses (e.g., the accesses are explicitly ordered by software). In order to support the strong Write-ordering model of system buses such as PCIe, incoming Writes from a PCIe device must be made visible in-order regardless of the accessed addresses.

The common use case, or litmus test, is a producer-device issuing Writes to a data buffer followed by a Write to a flag. This is sometimes called mailbox/doorbell communication. The consumer continuously polls the flag until observing that the flag is set; then, the consumer reads the data. Thus, any PCIe-order compliant memory system must ensure the flag does not become visible until any observer of the data will see the new value rather than stale data.

Note that software running on the ARM cores is written to the ARMv8 order model and, thus, will have barriers between stores to different addresses if deterministic order visibility is required. Writes from PCIe devices, however, may arrive out-of-order (OOO) due to different delays in the paths that the Writes transverse.

Embodiments according to the present invention provide for systems and methods that guarantee that data stored to memory becomes visible in the original PCIe device order, without losing bandwidth and across multiple PCIe masters. According to embodiments, any observer, including ARM software, will see the Writes in the intended order and hence the PCIe device does not need to explicitly fence between Writes.

(In the description hereinbelow, we will refer to ARMv8 processor cores and the PCIe system bus; the disclosed technique, however, is not limited to ARMv8 and/or to PCIe; any other relaxed-access-order processor core and/or any other total-store-order bus may be used in alternative embodiments in accordance with the present invention.)

Multiprocessor systems according to some embodiments comprise a system bus (e.g., PCIe); a multi-processor/memories complex, which will be referred to hereinbelow as Mesh; and Input Output (IO) units. Each PCIe device is coupled to the Mesh through a respective IO unit that is configured to interface with the PCIe bus, translate formats, communicate with the Mesh and communicate with neighboring IO units through a dedicated link (referred to hereinbelow as Ring). In a given IO unit, the PCIe bus and the ring are regarded as two different write-transaction sources.

Total-Store Order (TSO)

According to some embodiments, the IO unit comprises a Total Store Order (TSO) circuitry, which ensures ordered Writes. The TSO circuitry executes the following stages for each PCIe Write transaction:

1. Send A Write-request to the Mesh. The Write is not considered ordered yet.
2. Receive acknowledgement to the Write request from the Mesh. A this stage the Mesh guarantees that no observer will see the old data. The data location is locked by the Mesh.
3. Set the Write to TSO-Retire state.
4. Once older Writes have reached order point, set the Write to TSO-Send state.
5. Sends the Write data (this will also allow the Mesh to unlock the data location).

Note that the Write data may be received out-of-order by the various Mesh nodes, but any observer will be guaranteed to see the new data after step #2 above. Thus, it will not be possible for an observer to see the wrong Write order.

"RX" Causality

Causality is a byproduct of PCI TSO ordering rules that allows consumers to respond to a Write with the assumption that earlier Writes have already completed. For example, an observer seeing a set flag is guaranteed that a subsequent data read will retrieve the correct value. The cause of the data read cycle that the observer executes is the set flag, and, hence, the setting of the flag precedes the reading of the data. If data is written prior to the setting of the flag, the observer is guaranteed to get the new data.

Note that the same causality requirements are present if the ARM memory system is part of an endpoint (e.g., a Network Interface Circuit (NIC)) or part of the root complex (e.g., a Storage Controller). PCIe order rules are the same regardless of the direction of the transaction flow.

In embodiments according to the present invention, RX causality refers to maintaining proper global ordering for requests coming from the PCIe domain. Enforcing causality on the PCIe RX path is challenging because there are multiple ordering points that must behave as if they were a single ordered PCIe bus. In embodiments, the TSO Circuitry comprises Egress TSO Circuitry ("E-TSO") and Ingress TSO Circuitry ("I-TSO"); the E-TSO guarantees orderly execution of Write transaction that are received over the PCIe, and the I-TSO guarantees orderly execution of Write transaction that are sent over the PCIe.

In an embodiment, an IO unit may receive Write transactions from the PCIe and forward the transactions to two destinations (e.g., to the Ring and to the Mesh). The I-TSO comprises a counter which assigns sequential numbers to Write transactions that the IO unit receives from the PCIe; a first counter that keeps track of the sequential numbers assigned to Write transactions that are forwarded to the Ring and a second counter that keeps track of the sequential numbers that are assigned to Write transactions forwarded to the Mesh. The I-TSO synchronizes the two counters responsive to Write transactions that the IO unit sends to the Mesh and to the Ring, and responsive to the states of previous pending Write transaction. The I-TSO further controls the IO unit to send transactions to the Ring and to the Mesh, responsive to the order in which the IO unit receives the Write transactions from the PCIe. In some embodiments, the I-TSO further comprises a delay unit, which generates a delay corresponding to the expected delay of the Ring circuit; the I-TSO then delays sending Write transactions to the Mesh, to assure that previous data that was sent over the Ring has reached its destination.

In another embodiment, an IO unit may receive Write transactions from two sources (e.g., from the Ring and from the Mesh), and forward the Write transactions to the PCIe. The E-TSO comprises a counter, which assigns sequential numbers to Write transactions that the IO unit receives from the Mesh or from the Ring. The E-TSO further comprises a selector, which selects the older Write transaction, and forwards it to the PCIe.

Thus, according to embodiments of the present invention, an IO unit that is coupled to the Mesh, to the PCIe and to other IO units may comprise I-TSO and/or E-TSO circuits. The I-TSO is configured to control the IO unit so as to send Write transaction that the core receives from the PCIe through the IO unit, to either the Mesh or the Ring, in the order in which the IO unit receives the Write transactions. In some embodiments, after the IO unit sends a Write transaction through the Ring, the I-TSO delays sending a next message to the Mesh by a time period according to the delay in the Ring.

The E-TSO is configured to control the IO unit so as to send Write transactions that the IO unit receives from the PCIe, to either the Mesh or the Ring, in the order in which the IO unit receives the Write transaction. Total-Store-Order is obeyed (and, hence, software functionality is ensured) without stopping the units which initiate the Write transaction so that performance penalty is small.

System Description

Figure 1:
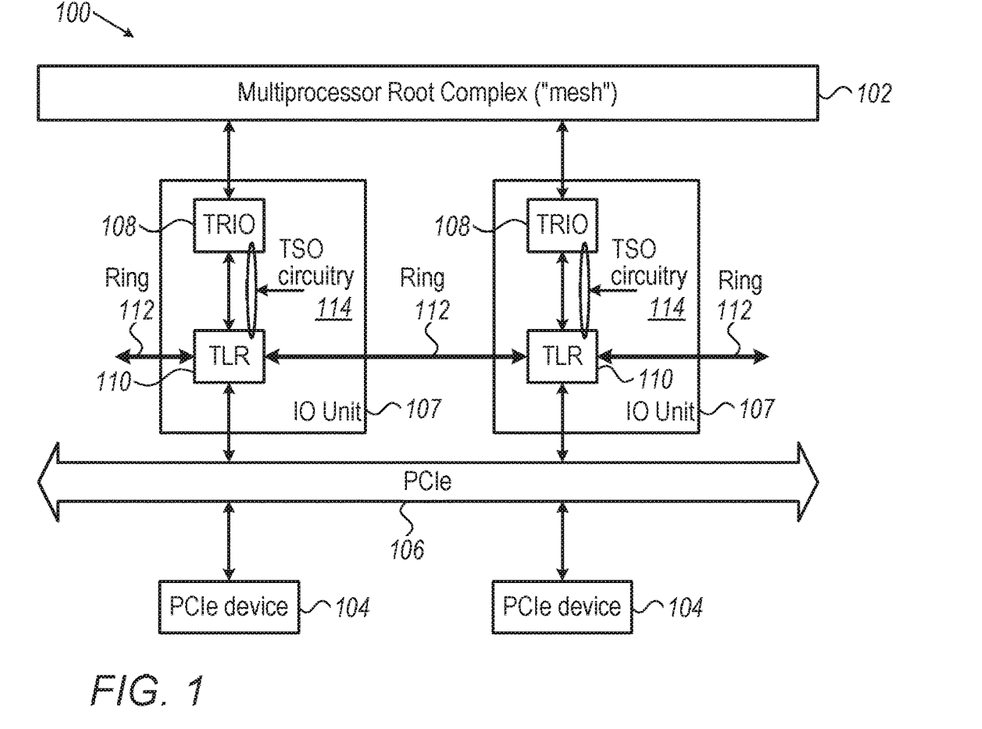
FIG. 1 is a block diagram that schematically illustrates the structure of a multi-processor system, in accordance with embodiments of the present invention.

FIG. 1 is a block diagram 100 that schematically illustrates the structure of a multi-processor system, in accordance with embodiments of the present invention. The system comprises a Multiprocessor Root Complex 102 (also referred to as Mesh), which is coupled to PCIe devices 104 (e.g., a Host Channel Adapter (HCA)) through a PCIe system bus 106.

The Mesh typically comprises multiple processor cores (e.g., ARM), memories including global memories and local cache memories.

Multiprocessor system 100 further comprises Input Output (IO) Unit 107, which are coupled to Mesh 102, to PCIe bus 106, and to each other. Each IO Unit comprises a Transaction-Input-Output (TRIO) unit 108, which; and, a Transaction-Layer (TLR) unit 110.

According to embodiments of the present invention, neighboring TLR units 110 may be coupled to each other by a Ring bus 112, to increase the bandwidth of inter-unit communication within the multiprocessor system. For example, two processors in Mesh 102 may communicate with each other through a section of the Ring 112.

Multiprocessor system 100 further comprises Total Store Order units (TSO) 114, which will be sometimes referred to hereinbelow as Write Ordering Circuitries (WOC). As will be described below, with reference to further figures, each TSO unit 114 comprises an Ingress-TSO unit and an Egress-TSO unit, for handling Write transactions from and to the PCIe, respectively; the I-TSO and E-TSO units are sometimes referred to as Ingress-Write-Ordering Circuitry (IWOC) and Egress-Write-Ordering Circuitry (EWOC), respectively. Communication over the PCIe follows Total Store Order discipline and Writes that the PCIe receives are always sent in the receive order. However, as there are three sources and two destinations to each Write transaction (the Mesh and the Ring) with varying delays, and as delays within the TLR and TRIO may vary, the order of the received Write transactions may be hindered. TSO units 114, which are distributed between TRIO units 108 and TLR units 110, reorder the Write transactions, ensuring total-store order, for Write transaction received from multiple sources and with varying input delays.

Thus, according to embodiments of the present invention, multiprocessor systems with a system bus that supports TSO ensure software functionality by guaranteeing TSO on all Write transactions, from the system bus and from other sources, with varying delays.

As would be appreciated, multiprocessor 100 illustrated in FIG. 1 and described hereinabove is cited by way of example. In alternative embodiments various suitable multiprocessor systems may be used. In some embodiments, some or all TRIO units 108, TLR units 110 and various parts of (or the complete) Mesh 102 may be incorporated in a System-On-Chip (SOC) integrated circuits.

The processors of Mesh 102 may be, for example, ARMV8, or any other suitable microcontroller; in some embodiments the Mesh comprises more than one type of processor.

In some embodiments, more than one Mesh may be used, interconnected with one or more system busses.

Although the system bus which is illustrated in FIG. 1 is PCIe, other TSO system busses may be used in alternative embodiments.

According to some embodiments, Ring connections 112 between TLR units 110 are not limited to connecting neighboring TLR units; for example, in some embodiments a multidimensional connection between TLR units may be employed. In some other embodiments, a star-type Ring connection is used, wherein TLR units inter-communicate through a central data-exchange unit.

Figure 2:
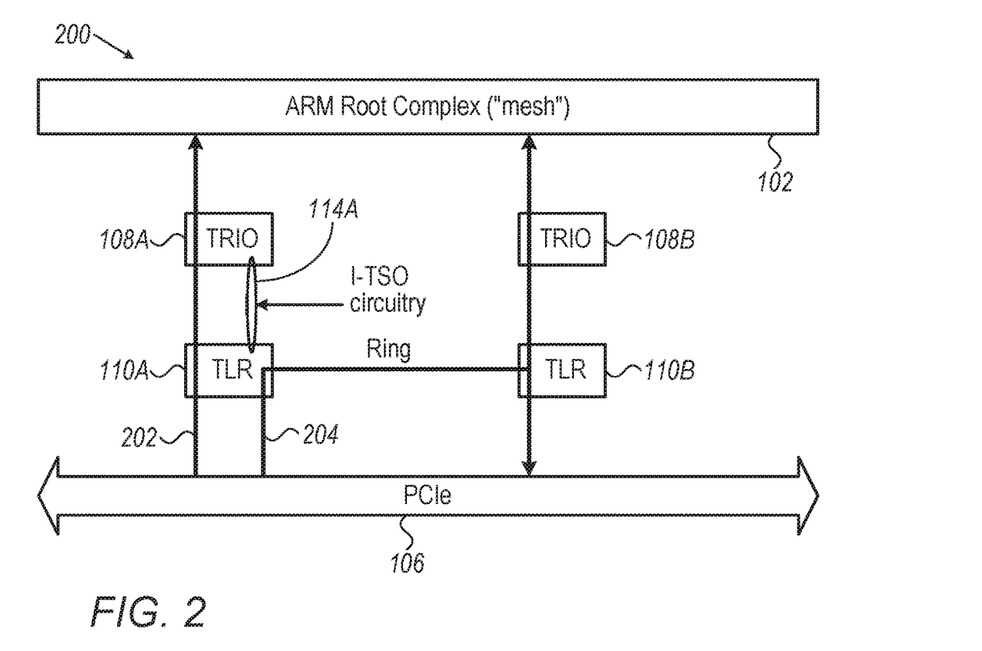
FIG. 2 is a block diagram that schematically illustrates the signal flow of two Write transactions that are ingress from a Peripheral Component Interconnect Express (PCIe) system bus and forwarded to two destinations, in accordance with embodiments of the present invention.

FIG. 2 is a block diagram 200 that schematically illustrates the signal flow of two Write transactions that are ingress from a PCIe system bus and forwarded to two destinations, in accordance with embodiments of the present invention. TLR 110A receives from PCIe 106 a first Write transaction 202, which is routed to Mesh 102, and a second Write transaction 204, which is routed to a peer TLR 110B and, from there, to either the PCIe bus or, through a peer TRIO 108B, to the Mesh.

I-TSO circuitry 114A guarantees that, although Write transaction 202, forwarded to the Mesh, has a different propagation delay than Write transaction 204, which is forwarded through the Ring to peer TLR 110B. Thus, I-TSO circuitry 114A ensures that an observer will see the data written in transactions 202 and 204 in the original order in which they are received from the PCIe, preserving the Total Store Order of the PCIe.

Figure 3:
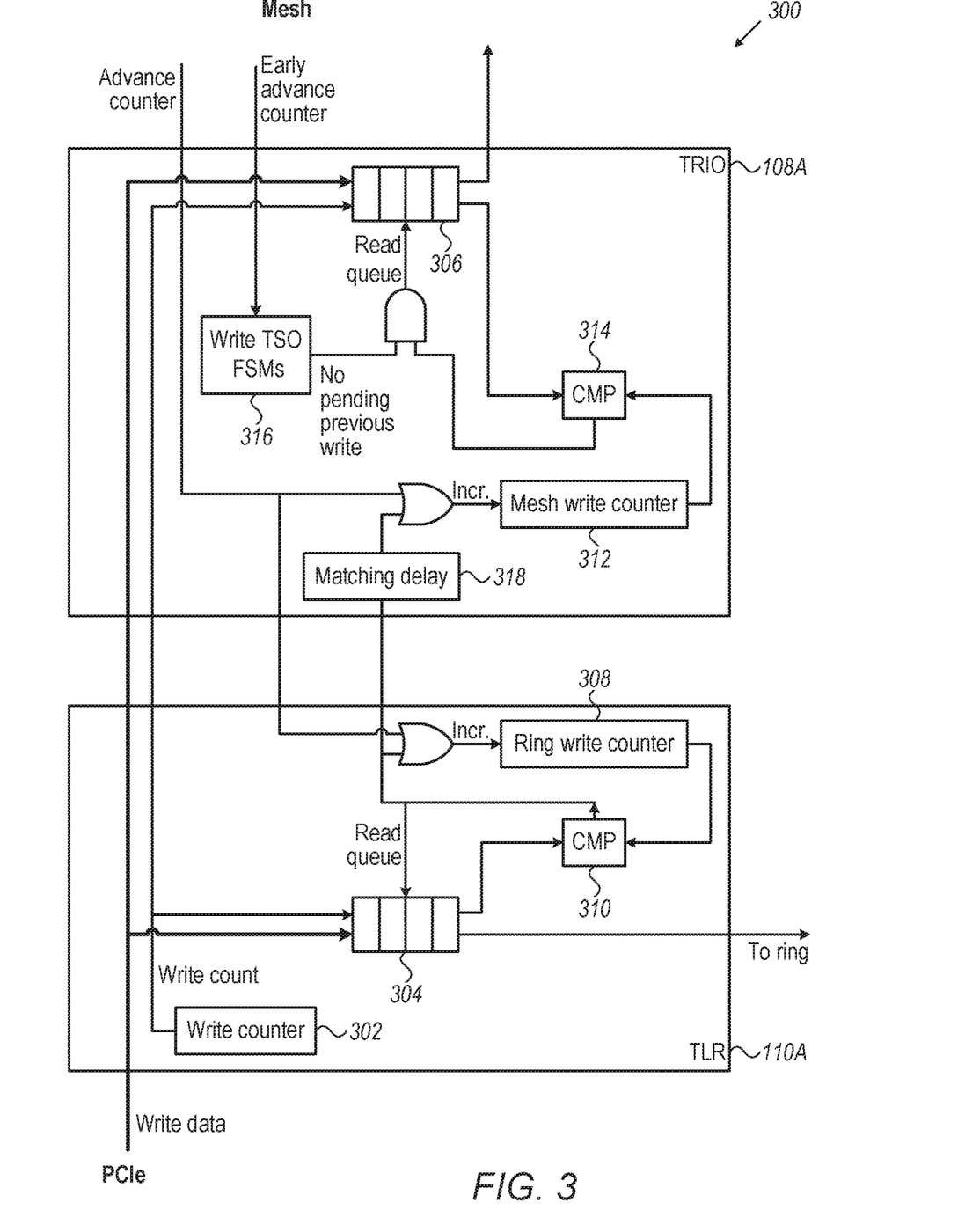
FIG. 3 is a block diagram that schematically illustrates the structure of an Ingress-Total-Store-Order (I-TSO) circuitry, in accordance with embodiments of the present invention.

FIG. 3 is a block diagram 300 that schematically illustrates the structure of an Ingress-Total-Store-Order (I-TSO) circuitry, in accordance with embodiments of the present invention. I-TSO 300 is distributed in TLR 110A, and TRIO 108A. The TLR receives Write transactions from the PCIe, which are routed to the Ring or to the Mesh. A Write-Counter 302 assigns sequential numbers to (e.g., counts) the Write transactions, and adds (e.g., concatenates) a Write-Count field to that data of each Write transaction.

A Queue 304 (e.g., a First-In-First-Out (FIFO) memory), located in TLR 110A, queues the Write transactions that are directed to the Ring, with the concatenated Write-Count fields. A similar Queue 306, located in TRIO 108A, queues the Write transactions that are directed to the Ring, with the corresponding Write-Count fields.

A Ring-Write Counter 308 keeps track of the Write-Count associated with next Write transaction that TLR 110A outputs to the Ring (and, thus, tracks the sequential number that the Write Counter assigns to the latest write transaction). A Comparator 310 compares the Ring Write counter to the Write-Count field of the oldest entry in Queue 304 and generates a Read-Queue signal when the Write Count field matches the contents of the Ring-Write Counter. As a result, Ring Write transactions in Queue 304 advance.

Similarly, a Mesh-Write Counter 312 keeps track of the Write-Count associated with next Write transaction that TRIO 108A outputs to the Mesh (and, thus, tracks the sequential number that the Write Counter assigns to the latest write transaction). A Comparator 314 compares the Mesh Write Counter to the Write-Count field of the oldest entry in Queue 306. However, Queue 306 will be read only if all previous mesh Writes have been completed. A Write-TSO-FSM 316, which receives early-advance-counter indication from the Mesh, keeps track of the statuses of all pending Writes to the Mesh, and a Read-Queue signal will be asserted if the Write Count field matches the contents of the Mesh-Write Counter and if there are no older pending Mesh Write transactions. As a result of the Read-Queue indication, Mesh Write transactions in Queue 306 will advance.

Ring-Write-Counter 308 increments when comparator 310 issues a Read-Queue to Queue 304; Mesh-Write-Counter 312 increments when the I-TSO receives an Advance-Counter indication from the Mesh (the Mesh sends an Advance Counter indication in response to a Write transaction that the Mesh receives from Queue 306).

In addition, Ring-Write-Counter 308 increments in response to an Advance Counter input from the Mesh, which indicates that a Write to the Mesh has been completed. Mesh Write Counter 312 also increments responsive to read-queue input to queue 304 (that is—responsive to issuing Write transactions to the Ring). A Delay unit 318 adds a delay that compensates for the delay of the Write transactions in the Ring, and hence, when Mesh Write Counter increments responsive to a Write transaction that is sent to the Ring, the actual timing of the increment will match the time that the Write transaction has propagated through the Ring.

Thus, according to the example circuit illustrated in FIG. 3, Total Store order is preserved for Write transactions that the IO unit receives from the PCIe and are forwarded to the Mesh and to the Ring. Penalty in performance is low, as the PCIe never has to stop sending Write transactions (except for the case where the queues overflow).

As would be appreciated, the configuration of I-TSO circuitry 300 is an example configuration that is depicted purely for the sake of conceptual clarity. Other suitable configurations may be used in alternative embodiments of the present invention. For example, in alternative embodiments, I-TSO circuitry may be centralized and located in the place where the Write transactions are received from the PCIe (rather than distributed in the TLR and TRIO, next to the Write transaction egress points). Write counter 302 may count upwards or downwards (when the counter counts down, the increments inputs to Ring-Write-Counter 308 and Mesh-Write-Counter 312 will be replaced by decrement inputs). In some embodiments, the Write counter is replaced by a unit that generates timestamps, and the Increment input to Ring-Write-Counter 308 and to Mesh-Write-Counter 312 will be replaced by circuitry that stores the next timestamp.

Figure 4:
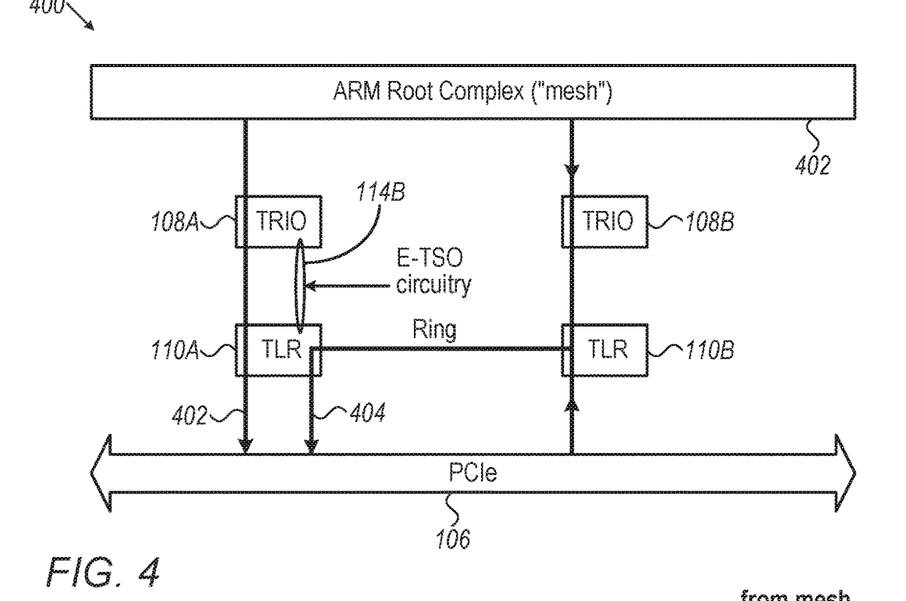
FIG. 4 is a block diagram that schematically illustrates the signal flow of two Write transactions that are received from two sources and egressed to a PCIe system bus, in accordance with embodiments of the present invention.

FIG. 4 is a block diagram 400 that schematically illustrates the signal flow of two Write transactions that are received from two sources and egressed to the PCIe system bus, in accordance with embodiments of the present invention. TRIO 108A receives a Write Transaction 402 from Mesh 102. TLR 110A receives a Write Transaction 404 from the Ring (e.g., from the Mesh or the PCIe, through peer TLR 110B). Both Write transactions should be routed to the PCIe.

E-TSO circuitry 114B guarantees that, although write transaction 402, sourced from the Mesh, has a different propagation delay from Write transaction 404, which is received through the Ring from peer TLR 110B. Thus, E-TSO circuitry 114B ensures that an observer will see the data written in transactions 402 and 404 in the original order in which they are received from the Mesh and the Ring, preserving Total Store Order.

Figure 5:
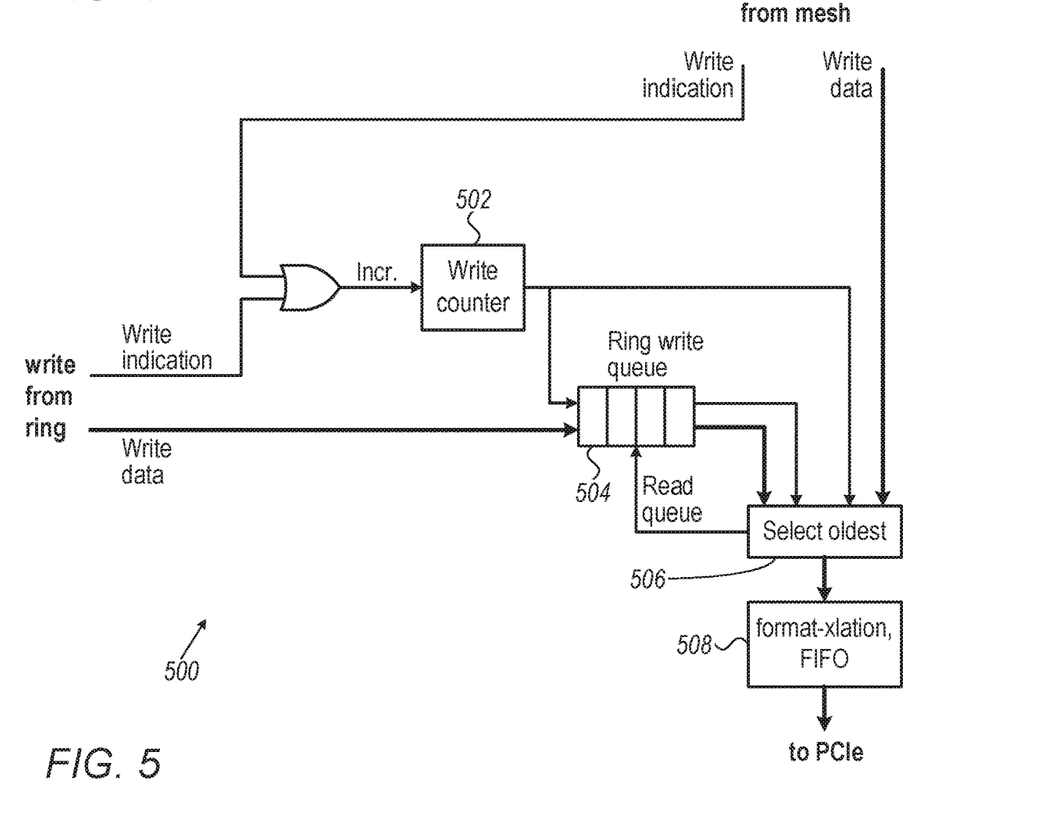
FIG. 5 is a block diagram that schematically illustrates the structure of an Egress-Total-Store-Order (E-TSO) circuitry, in accordance with embodiments of the present invention.

FIG. 5 is a block diagram that schematically illustrates the structure of an Egress-Total-Store-Order (E-TSO) circuitry 500, in accordance with embodiments of the present invention. The E-TSO receives Write transactions from the Mesh and from the Ring (respectively 102 and 110B, FIG. 4), each Write transaction input comprises the associated data and a Write-indication.

E-TSO 500 comprises a Write Counter 502, which is configured to count Write indications from either the Mesh or the Ring; a Write-Queue 504, which is configured to temporarily store Write transactions from the Ring concatenated with the value of the Write Counter; a Select-oldest multiplexor 506, which is configured to select the oldest between a Write transaction that the Mesh sends and the next Write transaction from Write-Queue 504, according to the lower value (between the Write-Count value that is stored in the oldest Write queue entry and the Write-Count that is concatenated to the Mesh Write data); and, a format-translator/FIFO, which is configured to translate the format of the Write transaction to PCIe-compatible format, and to temporarily store the selected Write transactions. Select-Oldest multiplexor 506 is further configured to send a read-queue input to Ring-Write-Counter 504 when the Write transaction that the multiplexor selects is the one sent by the queue, so that the Write transactions that are stored in the queue will advance.

Thus, according to the example embodiment illustrated in FIG. 5, Write transactions that the IO unit receives from either the Mesh or the Ring, will be sent to the PCIe in the order in which they are received.

As would be appreciated, the configuration of E-TSO circuitry 500 is an example configuration that is depicted purely for the sake of conceptual clarity. Other suitable configurations may be used in alternative embodiments of the present invention. For example, in alternative embodiments, E-TSO circuitry may comprise a second queue, for Write transaction that the Mesh sends; In some embodiments the Write Counter may be replaced by a unit that sends timestamps. In an embodiment, the counter counts backwards rather than forward, and the oldest Write transaction is the one with the highest Write-Count value.

The configuration of the I-TSO and E-TSO, including units and sub-units thereof, illustrated in FIGS. 1 through 5, are example configurations that are depicted purely for the sake of conceptual clarity. Any other suitable configurations can be used in alternative embodiments. The different E-TSO, I-TSO elements may be implemented using suitable hardware, such as in one or more Application-Specific Integrated Circuit (ASIC) or Field-Programmable Gate Arrays (FPGA), using software, using hardware, or using a combination of hardware and software elements.

ARM root complex 102 typically comprises programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A multiprocessor device, comprising:
a system bus;
a plurality of cores; and
at least one ingress-write ordering circuitry (IWOC), which comprises a first counter associated with the cores, and a second counter associated with an additional write-transaction destination, the IWOC configured to:
assign sequential numbers to write transactions that the IWOC receives from the system bus, according to an order of reception of the write transactions at the IWOC; and
forward the write transactions from the IWOC to the cores and to the additional write-transaction destination, while preserving the order, by:
incrementing the first and second counters such that both the first counter and the second counter track a sequential number of a next write transaction that the IWOC will forward;
forwarding a first write transaction to the cores only provided that the sequential number of the first write transaction matches the first counter; and
forwarding a second write transaction to the additional write-transaction destination only provided that the sequential number of the second write transaction matches the second counter.

2. The multiprocessor device according to claim 1, wherein the write transactions forwarded to the cores and to the additional write-transaction destination arrive at the cores and at the additional write-transaction destination after first and second delays, respectively, and wherein the IWOC is configured to increment the first counter based on the first delay, so as to reflect arrival times of the write transactions at the cores, and to increment the second counter based on the second delay, so as to reflect arrival times of the write transactions at the additional write-transaction destination.

3. The multiprocessor device according to claim 1, wherein the IWOC is configured to increment both the first counter and the second counter in response to forwarding a write transaction to either the cores or the additional write-transaction destination.

4. The multiprocessor device according to claim 1, wherein the IWOC comprises first and second queues and is configured to:
queue in the first queue the write transactions pending for forwarding to the cores, compare the sequential number of the write transaction at a head of the first queue to the first counter, and forward the write transaction at the head of the first queue only when the sequential number matches the first counter; and
queue in the second queue the write transactions pending for forwarding to the additional write-transaction destination, compare the sequential number of the write transaction at the head of the second queue to the second counter, and forward the write transaction at the head of the second queue only when the sequential number matches the second counter.

5. The multiprocessor device according to claim 1, further comprising at least one egress-write ordering circuitry (EWOC) that is configured to:
assign egress sequential numbers to egress write transactions that the EWOC receives from at least two write-transaction sources, according to an order of reception of the egress write transactions at the EWOC; and
select and output the egress write transactions from the EWOC, while preserving the order, responsive to the egress sequential numbers assigned to the egress write transactions.

6. The multiprocessor device according to claim 5, wherein one of the write-transaction sources comprises the cores, and wherein the EWOC is configured to output the egress write transactions to the system bus.

7. A method in a multiprocessor device having a plurality of cores and a system bus, the method comprising:
in at least one ingress-write ordering circuitry (IWOC), maintaining a first counter associated with the cores, and a second counter associated with an additional write-transaction destination;

assigning sequential numbers to write transactions that the IWOC receives from the system bus, according to an order of reception of the write transactions at the IWOC; and forwarding the write transactions from the IWOC to the cores and to the additional write-transaction destination, while preserving the order, by:

incrementing the first and second counters such that both the first counter and the second counter track a sequential number of a next write transaction that the IWOC will forward;

forwarding a first write transaction to the cores only provided that the sequential number of the first write transaction matches the first counter; and forwarding a second write transaction to the additional write-transaction destination only provided that the sequential number of the second write transaction matches the second counter.

8. The method according to claim 7, wherein the write transactions forwarded to the cores and to the additional write-transaction destination arrive at the cores and at the additional write-transaction destination after first and second delays, respectively, wherein incrementing the first counter is based on the first delay, so as to reflect arrival times of the write transactions at the cores, and wherein incrementing the second counter is based on the second delay, so as to reflect arrival times of the write transactions at the additional write-transaction destination.

9. The method according to claim 7, wherein incrementing both the first counter and the second counter is performed in response to forwarding a write transaction to either the cores or the additional write-transaction destination.

10. The method according to claim 7, wherein the IWOC comprises first and second queues, and wherein forwarding the write transactions comprises:

queuing in the first queue the write transactions pending for forwarding to the cores, comparing the sequential number of the write transaction at a head of the first queue to the first counter, and forwarding the write transaction at the head of the first queue only when the sequential number matches the first counter; and queuing in the second queue the write transactions pending for forwarding to the additional write-transaction destination, comparing the sequential number of the write transaction at the head of the second queue to the second counter, and forwarding the write transaction at the head of the second queue only when the sequential number matches the second counter.

11. The method according to claim 7, further comprising: in at least one egress-write ordering circuitry (EWOC), assigning egress sequential numbers to egress write transactions that the EWOC receives from at least two write-transaction sources, according to an order of reception of the egress write transactions at the EWOC; and selecting and outputting the egress write transactions from the EWOC, while preserving the order, responsive to the egress sequential numbers assigned to the egress write transactions.

12. The method according to claim 11, wherein one of the egress write-transaction sources comprise the cores, and wherein outputting the egress write transactions comprises outputting the egress write transactions to the system bus of the multiprocessor device.

13. A multiprocessor device, comprising:
a plurality of cores; and at least one ingress-write ordering circuitry (IWOC), which comprises a first counter associated with a first write-transaction destination, and a second counter associated with a second write-transaction destination, the IWOC configured to:

assign sequential numbers to write transactions that the IWOC receives from a write-transactions source, according to an order of reception of the write transactions at the IWOC; and forward the write transactions from the IWOC to the first and second write-transaction destinations, while preserving the order, by:

incrementing both the first counter and the second counter in response to forwarding a write transaction to either the first write-transaction destination or the second write-transaction destination, such that both the first counter and the second counter track a sequential number of a next write transaction that the IWOC will forward;

forwarding a first write transaction to the first write-transaction destination only provided that the sequential number of the first write transaction matches the first counter; and forwarding a second write transaction to the second write-transaction destination only provided that the sequential number of the second write transaction matches the second counter.

14. The multiprocessor device according to claim 13, further comprising a system bus, wherein the write-transactions source comprises the system bus, and wherein the first write-transaction destination comprises the cores.

15. The multiprocessor device according to claim 13, wherein the write transactions forwarded to the first and second write-transaction destinations arrive at the first and second write-transaction destinations after first and second delays, respectively, and wherein the IWOC is configured to increment the first counter based on the first delay, so as to reflect arrival times of the write transactions at the first write-transaction destination, and to increment the second counter based on the second delay, so as to reflect arrival times of the write transactions at the second write-transaction destination.

16. The multiprocessor device according to claim 1, wherein the IWOC comprises first and second queues and is configured to:

queue in the first queue the write transactions pending for forwarding to the first write-transaction destination, compare the sequential number of the write transaction at a head of the first queue to the first counter, and forward the write transaction at the head of the first queue only when the sequential number matches the first counter; and queue in the second queue the write transactions pending for forwarding to the second write-transaction destination, compare the sequential number of the write transaction at the head of the second queue to the second counter, and forward the write transaction at the head of the second queue only when the sequential number matches the second counter.

17. A method in a multiprocessor device having a plurality of cores, the method comprising:

in at least one ingress-write ordering circuitry (IWOC), maintaining a first counter associated with a first write-transaction destination, and a second counter associated with a second write-transaction destination;

assigning sequential numbers to write transactions that the IWOC receives from a write-transactions source, according to an order of reception of the write transactions at the IWOC; and forwarding the write transactions from the IWOC to the first and second write-transaction destinations, while preserving the order, by:
  incrementing both the first counter and the second counter in response to forwarding a write transaction to either the first write-transaction destination or the second write-transaction destination, such that both the first counter and the second counter track a sequential number of a next write transaction that the IWOC will forward;
  forwarding a first write transaction to the first write-transaction destination only provided that the sequential number of the first write transaction matches the first counter; and
  forwarding a second write transaction to the second write-transaction destination only provided that the sequential number of the second write transaction matches the second counter.

18. The method according to claim 17, wherein the write-transactions source comprises a system bus of the multiprocessor device, and wherein the first write-transaction destination comprises the cores.

19. The method according to claim 17, wherein the write transactions forwarded to the first and second write-transaction destinations arrive at the first and second write-transaction destinations after first and second delays, respectively, wherein incrementing the first counter is based on the first delay, so as to reflect arrival times of the write transactions at the first write-transaction destination, and wherein incrementing the second counter is based on the second delay, so as to reflect arrival times of the write transactions at the second write-transaction destination.

20. The method according to claim 17, wherein the IWOC comprises first and second queues, and wherein forwarding the write transactions comprises:
  queuing in the first queue the write transactions pending for forwarding to the first write-transaction destination, comparing the sequential number of the write transaction at a head of the first queue to the first counter, and forwarding the write transaction at the head of the first queue only when the sequential number matches the first counter; and
  queuing in the second queue the write transactions pending for forwarding to the second write-transaction destination, comparing the sequential number of the write transaction at the head of the second queue to the second counter, and forwarding the write transaction at the head of the second queue only when the sequential number matches the second counter.

* * * * *